(12) United States Patent
Kobayashi

(10) Patent No.: US 11,949,248 B2
(45) Date of Patent: Apr. 2, 2024

(54) POWER-OVER-FIBER SYSTEM

(71) Applicant: KYOCERA CORPORATION, Kyoto (JP)

(72) Inventor: Takahiro Kobayashi, Sagamihara (JP)

(73) Assignee: KYOCERA CORPORATION, Kyoto (JP)

( * ) Notice: Subject to any disclaimer, the term of this patent is extended or adjusted under 35 U.S.C. 154(b) by 115 days.

(21) Appl. No.: 17/755,002

(22) PCT Filed: Sep. 17, 2020

(86) PCT No.: PCT/JP2020/035277
§ 371 (c)(1),
(2) Date: Apr. 19, 2022

(87) PCT Pub. No.: WO2021/079663
PCT Pub. Date: Apr. 29, 2021

(65) Prior Publication Data
US 2022/0393514 A1    Dec. 8, 2022

(30) Foreign Application Priority Data

Oct. 21, 2019  (JP) ................................ 2019-191742

(51) Int. Cl.
| | |
|---|---|
| *H02J 50/30* | (2016.01) |
| *G01S 7/481* | (2006.01) |
| *G01S 17/10* | (2020.01) |
| *H02J 50/80* | (2016.01) |
| *H04B 10/071* | (2013.01) |

(Continued)

(52) U.S. Cl.
CPC ............ *H02J 50/30* (2016.02); *G01S 7/4818* (2013.01); *G01S 17/10* (2013.01); *H02J 50/80* (2016.02); *H04B 10/071* (2013.01); *H04B 10/25* (2013.01); *H04B 10/807* (2013.01)

(58) Field of Classification Search
CPC ............................... H02J 50/30; H04B 10/807
See application file for complete search history.

(56) References Cited

U.S. PATENT DOCUMENTS

| | | | | |
|---|---|---|---|---|
| 6,734,411 | B1* | 5/2004 | Imbsei | H04B 10/07955 250/227.16 |
| 2015/0335231 | A1* | 11/2015 | Van Der Mark | A61B 1/00126 600/407 |
| 2019/0019912 | A1* | 1/2019 | Nugent, Jr. | H01L 31/0547 |

FOREIGN PATENT DOCUMENTS

| | | |
|---|---|---|
| JP | H814501 B2 | 2/1996 |
| JP | 2010135989 A | 6/2010 |

(Continued)

*Primary Examiner* — Ryan Johnson
(74) *Attorney, Agent, or Firm* — HAUPTMAN HAM, LLP

(57) ABSTRACT

To improve the optical power supply efficiency, a power-over-fiber system includes a power sourcing equipment including a semiconductor laser that oscillates with electric power to output feed light, a powered device including a photoelectric conversion element that converts the feed light into electric power, a plurality of optical fiber cables that transmit the feed light, a measurer that measures a distance from the power sourcing equipment to the powered device, and a control device that controls the power sourcing equipment to output the feed light after compensating for an amount of attenuation of the feed light according to a transmission distance on the basis of the distance from the power sourcing equipment to the powered device measured by the measurer.

12 Claims, 7 Drawing Sheets

(51) Int. Cl.
    *H04B 10/25*    (2013.01)
    *H04B 10/80*    (2013.01)

(56) References Cited

FOREIGN PATENT DOCUMENTS

| | | |
|---|---|---|
| JP | 2018107910 A | 7/2018 |
| JP | 201913100 A | 1/2019 |

* cited by examiner

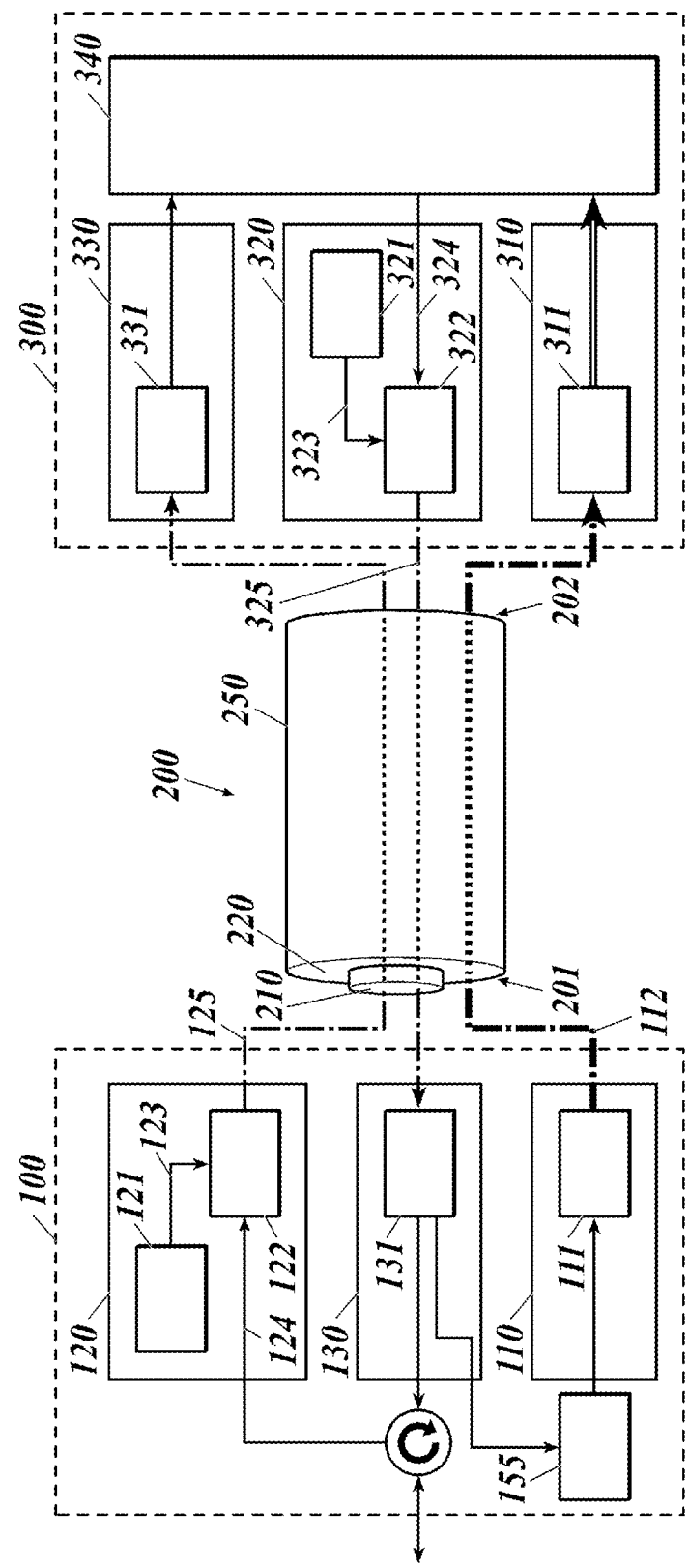

POWER-OVER-FIBER SYSTEM

RELATED APPLICATIONS

The present application is a National Phase of International Application No. PCT/JP2020/035277 filed Sep. 17, 2020, which claims priority to Japanese Application No. 2019-191742, filed Oct. 21, 2019.

TECHNICAL FIELD

The present disclosure relates a power-over-fiber system.

BACKGROUND ART

Recently, there has been studied an optical power supply system that converts electric power into light (called feed light), transmits the feed light, converts the feed light into electric energy, and uses the electric energy as electric power.

PTL 1 discloses an optical communication device including an optical transmitter, an optical fiber, and an optical receiver. The optical transmitter transmits signal light modulated based on an electric signal and feed light for supplying electric power. The optical fiber includes a core, a first cladding surrounding the core, and a second cladding surrounding the first cladding. The core transmits the signal light. The first cladding has a refractive index lower than that of the core and transmits the feed light. The second cladding has a refractive index lower than that of the first cladding. The optical receiver operates with electric power obtained by converting the feed light transmitted through the first cladding of the optical fiber and converts the signal light transmitted through the core of the optical fiber into the electric signal.

CITATION LIST

Patent Literature

PTL 1: Japanese Unexamined Patent Application Publication No. 2010-135989

SUMMARY OF INVENTION

Technical Problem

In optical power supply, further improvement in optical power supply efficiency is desired. As one form of the improvement, improvement in photoelectric conversion efficiency on a power-sourcing side and a powered side is desired.

Solution to Problem

A power-over-fiber system according to one aspect of the present disclosure includes
a power sourcing equipment including a semiconductor laser that oscillates with electric power to output feed light,
a powered device including a photoelectric conversion element that converts the feed light into electric power,
an optical fiber cable that transmits the feed light from the power sourcing equipment to the powered device,
a measurer that measures a distance from the power sourcing equipment to the powered device, and
a control device that controls the power sourcing equipment to output the feed light after compensating for an amount of attenuation of the feed light according to a transmission distance on the basis of the distance from the power sourcing equipment to the powered device measured by the measurer.

BRIEF DESCRIPTION OF DRAWINGS

FIG. 8 is a diagram illustrating a fourth configuration example in which the power-over-fiber system according to the second embodiment of the present disclosure includes a configuration that performs power supply according to a transmission distance.

DESCRIPTION OF EMBODIMENTS

One embodiment of the present disclosure is described below with reference to the drawings.

(1) Overview of System

First Embodiment

Figure 1:
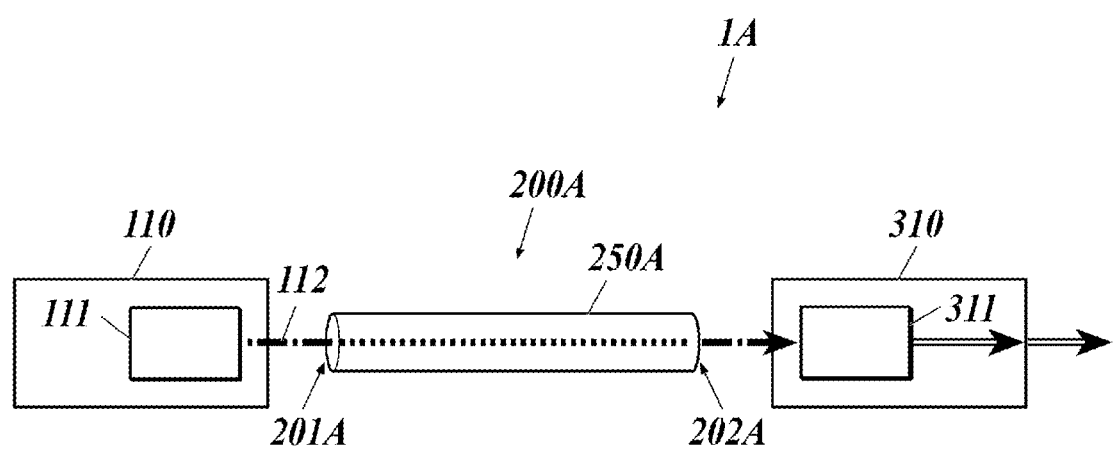
FIG. 1 is a diagram illustrating a configuration of a power-over-fiber system according to a first embodiment of the present disclosure.

As illustrated in FIG. 1, a power-over-fiber (PoF) system 1A according to the present embodiment includes a power sourcing equipment (PSE) 110, an optical fiber cable 200A, and a powered device (PD) 310.

In the present disclosure, the power sourcing equipment is a device that converts electric power into optical energy and supplies the optical energy, and the powered device is a device that receives the supplied optical energy and converts the optical energy into electric power.

The power sourcing equipment 110 includes a semiconductor laser 111 for power supply.

The optical fiber cable 200A includes an optical fiber 250A that forms a channel of feed light.

The powered device 310 includes a photoelectric conversion element 311.

The power sourcing equipment 110 is connected to a power source, which electrically drives the semiconductor laser 111 for power supply and so on.

The semiconductor laser 111 for power supply oscillates with electric power supplied from the power source to output feed light 112.

The optical fiber cable 200A has one end 201A connectable to the power sourcing equipment 110 and another end 202A connectable to the powered device 310, and transmits the feed light 112.

The feed light 112 from the power sourcing equipment 110 is input to the one end 201A of the optical fiber cable 200A. The feed light 112 propagates through the optical fiber 250A and is output from the other end 202A to the powered device 310.

The photoelectric conversion element 311 converts the feed light 112 transmitted through the optical fiber cable 200A into electric power. The electric power obtained by the photoelectric conversion element 311 through the conversion is used as driving electric power needed in the powered device 310. The powered device 310 is capable of outputting, for an external device, the electric power obtained by the photoelectric conversion element 311 through the conversion.

Semiconductor materials of semiconductor regions that exhibit a light-electricity conversion effect of the semiconductor laser 111 for power supply and the photoelectric conversion element 311 are semiconductors having a short laser wavelength of 500 nm or shorter.

Semiconductors having a short laser wavelength have a large band gap and a high photoelectric conversion efficiency. Thus, the photoelectric conversion efficiency on the power-generating side and the powered-side of optical power supply improves, and consequently the optical power supply efficiency improves.

Therefore, as such semiconductor materials, for example, semiconductor materials that are laser media having a laser wavelength (fundamental wave) of 200 to 500 nm such as diamond, gallium oxide, aluminum nitride, and gallium nitride may be used.

As the semiconductor materials, semiconductors having a band gap of 2.4 eV or greater are used.

For example, semiconductor materials that are laser media having a band gap of 2.4 to 6.2 eV such as diamond, gallium oxide, aluminum nitride, and gallium nitride may be used.

Laser light having a longer wavelength tends to have a higher transmission efficiency. Laser light having a shorter wavelength tends to have a higher photoelectric conversion efficiency. Thus, in the case of long-distance transmission, a semiconductor material that is a laser medium having a laser wavelength (fundamental wave) longer than 500 nm may be used. When the photoelectric conversion efficiency is prioritized, a semiconductor material that is a laser medium having a laser wavelength (fundamental wave) shorter than 200 nm may be used.

These semiconductor materials may be used in either the semiconductor laser 111 for power supply or the photoelectric conversion element 311. The photoelectric conversion efficiency is improved on the power-sourcing side or the powered side, and consequently the optical power supply efficiency improves.

Second Embodiment

Figure 2:
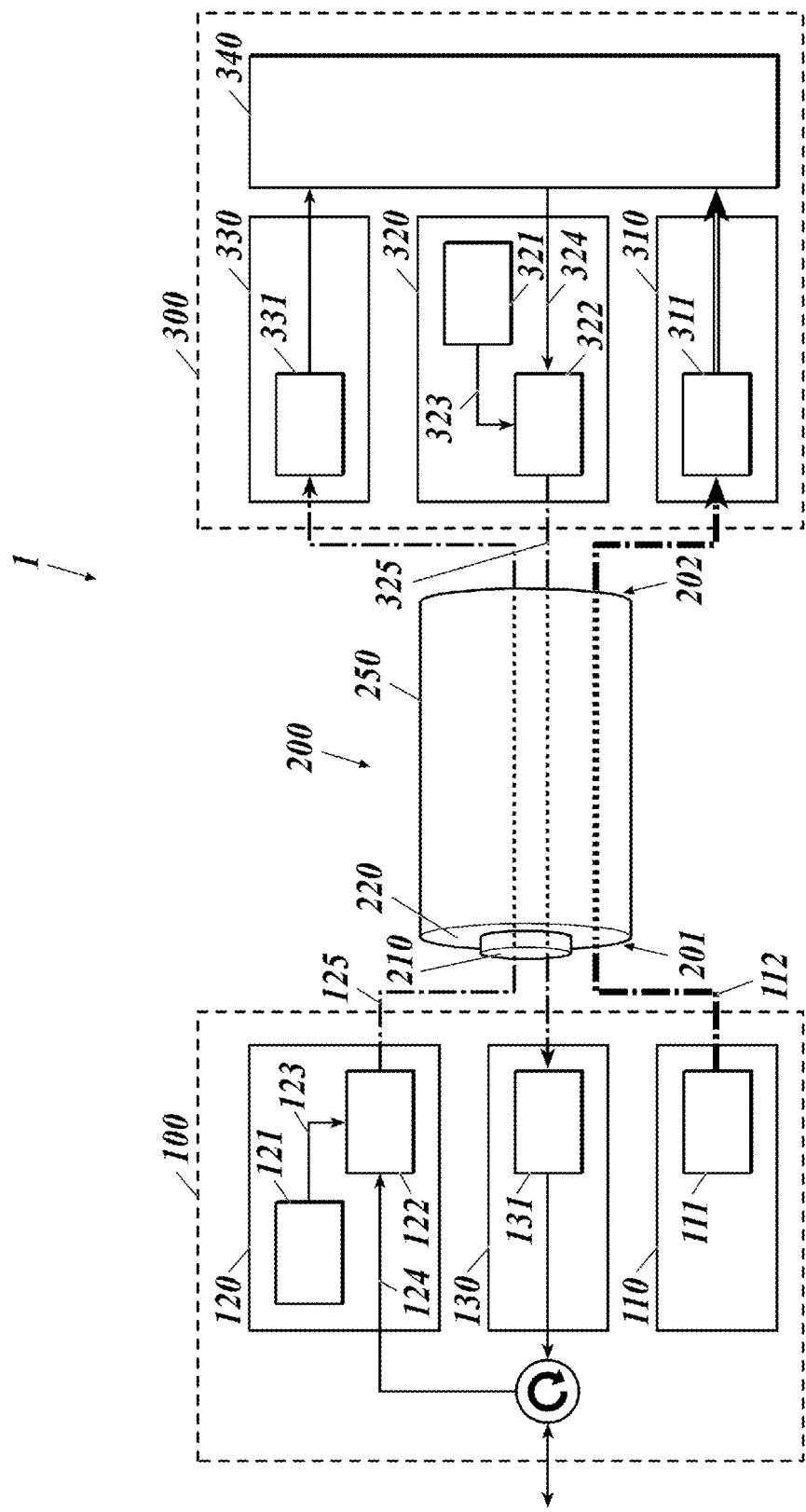
FIG. 2 is a diagram illustrating a configuration of a power-over-fiber system according to a second embodiment of the present disclosure.

As illustrated in FIG. 2, a power-over-fiber (PoF) system 1 according to the present embodiment is a system including an optical power supply system and an optical communication system with an optical fiber. In a strict sense, the power-over-fiber system 1 includes a first data communication device 100 including a power sourcing equipment (PSE) 110, an optical fiber cable 200, and a second data communication device 300 including a powered device (PD) 310.

In the description below, as a rule, components, which are donated by the same reference signs as those of already-described components, are the same as the already-described components unless otherwise noted.

The power sourcing equipment 110 includes a semiconductor laser 111 for power supply. The first data communication device 100 includes, in addition to the power sourcing equipment 110, a transmitter 120 and a receiver 130 that perform data communication. The first data communication device 100 corresponds to a data terminal equipment (DTE), a repeater, or the like. The transmitter 120 includes a semiconductor laser 121 for signals and a modulator 122. The receiver 130 includes a photodiode 131 for signals.

The optical fiber cable 200 includes an optical fiber 250 including a core 210 and a cladding 220. The core 210 forms a channel of signal light. The cladding 220 is arranged to surround the core 210 and forms a channel of feed light.

The powered device 310 includes a photoelectric conversion element 311. The second data communication device 300 includes, in addition to the powered device 310, a transmitter 320, a receiver 330, and a data processor 340. The second data communication device 300 corresponds to a power end station or the like. The transmitter 320 includes a semiconductor laser 321 for signals and a modulator 322. The receiver 330 includes a photodiode 331 for signals. The data processor 340 is a unit that processes a received signal. The second data communication device 300 is a node in a communication network. Alternatively, the second data communication device 300 may be a node that communicates with another node.

The first data communication device 100 is connected to a power source, which electrically drives the semiconductor laser 111 for power supply, the semiconductor laser 121 for signals, the modulator 122, the photodiode 131 for signals, and so on. The first data communication device 100 is a node in the communication network. Alternatively, the first data communication device 100 may be a node that communicates with another node.

The semiconductor laser 111 for power supply oscillates with electric power supplied from the power source to output feed light 112.

The photoelectric conversion element 311 converts the feed light 112 transmitted through the optical fiber cable 200 into electric power. The electric power obtained by the photoelectric conversion element 311 through the conversion is used as driving electric power for the transmitter 320, the receiver 330, and the data processor 340 and as other driving electric power needed in the second data communication device 300. The second data communication device 300 may be capable of outputting, for an external device, the electric power obtained by the photoelectric conversion element 311 through the conversion.

On the other hand, the modulator 122 of the transmitter 120 modulates laser light 123 output from the semiconductor laser 121 for signals into signal light 125 on the basis of transmission data 124, and outputs the signal light 125.

The photodiode 331 for signals of the receiver 330 demodulates the signal light 125 transmitted through the optical fiber cable 200 into an electric signal, and outputs the electric signal to the data processor 340. The data processor 340 transmits data based on the electric signal to a node. The data processor 340 also receives data from the node, and outputs, as transmission data 324, the data to the modulator 322.

The modulator 322 of the transmitter 320 modulates laser light 323 output from the semiconductor laser 321 for signals into signal light 325 on the basis of the transmission data 324, and outputs the signal light 325.

The photodiode 131 for signals of the receiver 130 demodulates the signal light 325 transmitted through the optical fiber cable 200 into an electric signal, and outputs the electric signal. Data based on the electric signal is transmitted to a node. Data from the node is treated as the transmission data 124.

The feed light 112 and the signal light 125 output from the first data communication device 100 are input to one end 201 of the optical fiber cable 200. The feed light 112 and the signal light 125 propagate through the cladding 220 and the core 210, respectively, and are output from another end 202 of the optical fiber cable 200 to the second data communication device 300.

The signal light 325 output from the second data communication device 300 is input to the other end 202 of the optical fiber cable 200, propagates through the core 210, and is output from the one end 201 of the optical fiber cable 200 to the first data communication device 100.

Figure 3:
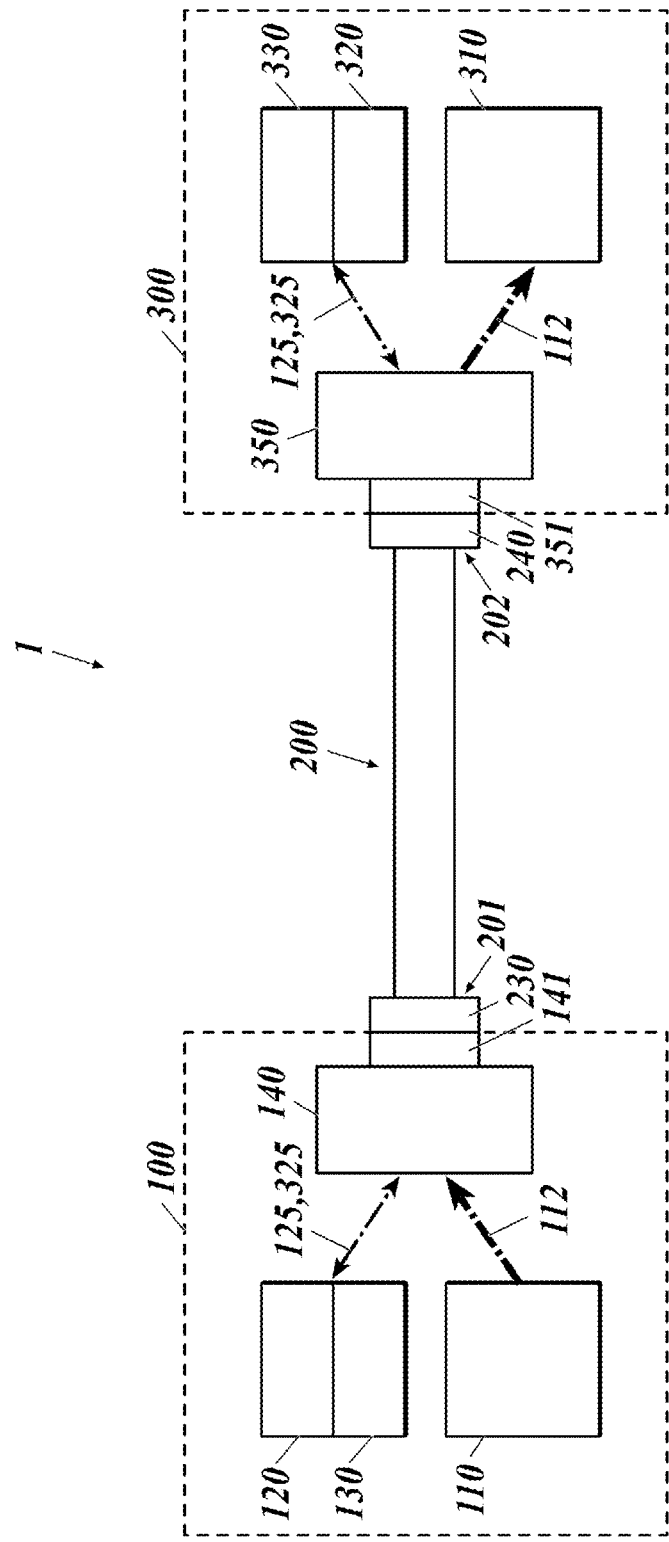
FIG. 3 is a diagram illustrating the configuration of the power-over-fiber system according to the second embodiment of the present disclosure, and illustrates optical connectors, etc.

As illustrated in FIG. 3, the first data communication device 100 includes a light input/output part 140 and an optical connector 141 attached to the light input/output part 140. In addition, the second data communication device 300 includes a light input/output part 350 and an optical connector 351 attached to the light input/output part 350. An optical connector 230 at the one end 201 of the optical fiber cable 200 is connected to the optical connector 141. An optical connector 240 at the other end 202 of the optical fiber cable 200 is connected to the optical connector 351. The light input/output part 140 guides the feed light 112 to the cladding 220, guides the signal light 125 to the core 210, and guides the signal light 325 to the receiver 130. The light input/output part 350 guides the feed light 112 to the powered device 310, guides the signal light 125 to the receiver 330, and guides the signal light 325 to the core 210.

As described above, the optical fiber cable 200 has the one end 201 connectable to the first data communication device 100 and the other end 202 connectable to the second data communication device 300, and transmits the feed light 112. Further, in the present embodiment, the optical fiber cable 200 transmits the signal light 125 and the signal light 325 bidirectionally.

As semiconductor materials of semiconductor regions that exhibit a light-electricity conversion effect of the semiconductor laser 111 for power supply and the photoelectric conversion element 311, same and/or similar materials as those mentioned in the first embodiment may be used, so that a high optical power supply efficiency is implemented.

Figure 4:
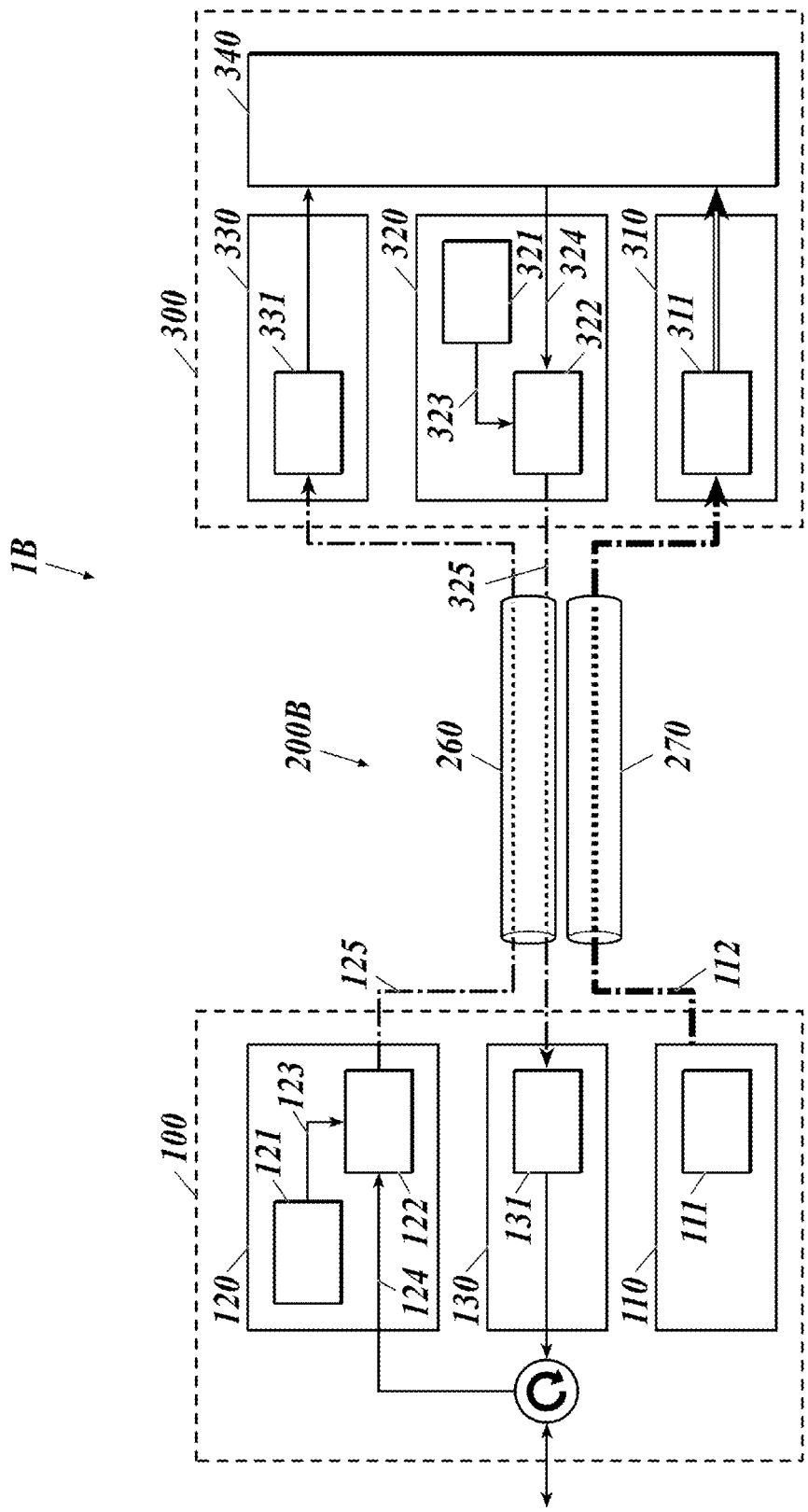
FIG. 4 is a diagram illustrating a configuration of a power-over-fiber system according to another embodiment of the present disclosure.

As in an optical fiber cable 200B of a power-over-fiber system 1B illustrated in FIG. 4, an optical fiber 260 that transmits signal light and an optical fiber 270 that transmits feed light may be provided separately. The optical fiber cable 200B may be constituted by a plurality of optical fiber cables.

(2) Regarding Configuration that Performs Power Supply According to Transmission Distance

[First Configuration Example that Performs Power Supply According to Transmission Distance]

A first configuration example that performs power supply according to a transmission distance is described next with reference to the drawing.

Figure 5:
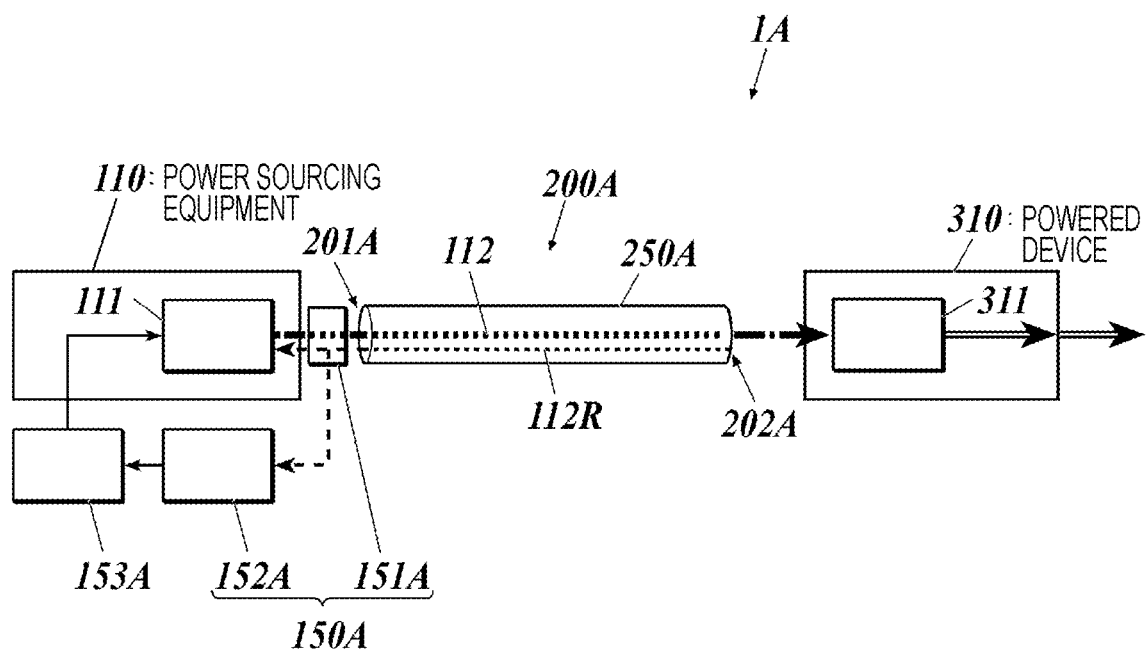
FIG. 5 is a diagram illustrating a first configuration example in which the power-over-fiber system according to the first embodiment of the present disclosure includes a configuration that performs power supply according to a transmission distance.

FIG. 5 illustrates a first configuration example in which the power-over-fiber system 1A described above includes a configuration that performs power supply according to a transmission distance.

In the description below, as a rule, components, which are donated by the same reference signs as those of already-described components, are the same as the already-described components unless otherwise noted.

This power-over-fiber system 1A additionally includes, as the configuration that performs power supply according to a transmission distance, a measurer 150A and a control device 153A. The measurer 150A measures a distance from the power sourcing equipment 110 to the powered device 310. The control device 153A controls the power sourcing equipment 110 to output the feed light 112 after compensating for an amount of attenuation of the feed light 112 based on the distance from the power sourcing equipment 110 to the powered device 310 measured by the measurer 150A.

The power-over-fiber system 1A of the first configuration example described above includes a separator 151A, a photodiode 152A, and the control device 153A. The separator 151A is disposed between the power sourcing equipment 110 and the optical fiber cable 200A and extracts reflected light 112R of the feed light 112 reflected at an end (end face) of the optical fiber cable 200A adjacent to the powered device 310. The photodiode 152A receives the reflected light 112R extracted by the separator 151A. The control device 153A controls the power sourcing equipment 110 on the basis of the detection performed by the photodiode 152A.

The separator 151A is constituted by a beam splitter, an optical coupler, or the like, and is disposed between the semiconductor laser 111 for power supply and the optical fiber cable 200A.

This separator 151A allows the feed light 112 that is to travel from the semiconductor laser 111 for power supply to the optical fiber cable 200A to pass therethrough. The separator 151A also transmits, to the photodiode 152A, part of the reflected light 112R that is to travel from the optical fiber cable 200A to the semiconductor laser 111 for power supply.

The separator 151A may be disposed in the middle of the optical fiber cable 200A, near an end of the optical fiber cable 200A adjacent to the power sourcing equipment 110.

The photodiode 152A is disposed to face a direction in which the separator 151A reflects the reflected light 112R, and detects a light intensity of the reflected light 112R incident thereto. A detection signal of the photodiode 152A is input to the control device 153A.

At the time of measurement of a distance from the power sourcing equipment 110 to the powered device 310, the control device 153A outputs the single-pulse feed light 112 from the semiconductor laser 111 for power supply and measures a time elapsed before the photodiode 152A detects the reflected light 122R of the feed light 112. The control device 153A calculates the distance from the power sourcing equipment 110 to the powered device 310 on the basis of the measured elapsed time.

Specifically, the control device 153A that has the function of calculating the distance, the separator 151A, and the photodiode 152A constitute the measurer 150A.

The control device 153A includes a memory that stores a table data indicating a relationship between an attenuation rate of the feed light 112 and a transmission distance. With reference to the table data, the control device 153A identifies an attenuation rate corresponding to the distance from the power sourcing equipment 110 to the powered device 310 obtained through the measurement.

After obtaining the attenuation rate of the feed light 112, the control device 153A controls the semiconductor laser 111 for power supply to output the feed light such that the feed light has an intensity equal to the sum of the original output and an amount of attenuation based on the attenuation rate. Alternatively, when the intensity of the feed light 112 is deficient from the intensity required by the powered device 310 because of attenuation related to the transmission distance, the control device 153A may control the semiconductor laser 111 for power supply such that the feed light 112 has an intensity obtained by adding the deficient amount.

After measuring the distance from the power sourcing equipment 110 to the powered device 310, the control device 153A continuously controls the semiconductor laser 111 for power supply such that the feed light 112 has an intensity obtained by compensating for the attenuation amount.

The control device 153A described above may be constituted by a microcomputer, or by a sequencer using an analog circuit or a digital circuit.

The distance from the power sourcing equipment 110 to the powered device 310 is measured when power supply is started (including a timing immediately before the start) or when the power-over-fiber system 1A starts up (including a timing immediately before the startup).

As described before, the power-over-fiber system 1A of the first configuration example includes the measurer 150A that measures a distance from the power sourcing equipment 110 to the powered device 310, and the control device 153A that controls the power sourcing equipment 110 to output the feed light 112 after compensating for an amount of attenuation of the feed light 112. Thus, the power-over-fiber system 1A can improve the photoelectric conversion efficiency and also perform appropriate power supply by compensating for the attenuation of the feed light 112 caused according to the length of the optical fiber cable 200A.

The measurer 150A uses reflection of the feed light 112, which is laser light, at the end face of the optical fiber cable 200A to measure the distance from the power sourcing equipment 110 to the powered device 310.

Thus, a configuration for reflecting the feed light 112 need not be prepared separately. This can reduce the number of components and reduce the manufacturing cost of the device accordingly.

In the case where the measurer 150A measures the distance from the power sourcing equipment 110 to the powered device 310 when the power sourcing equipment 110 starts the power supply (including a timing immediately before the start), the power sourcing equipment 110 can perform the power supply thereafter with the feed light 112 having an appropriate intensity.

In the case where the measurer 150A measures the distance from the power sourcing equipment 110 to the powered device 310 when the control device 153A starts up (including a timing immediately before the startup), the frequency of measurement reduces and thus the frequency can be made appropriate.

For example, the power-over-fiber system 1A is restarted when the specifications of the system are changed because of part replacement or maintenance. In such a case, the distance can be measured again. Thus, the power supply can be performed with the feed light 112 having a new appropriate intensity in response to the change or the like.

[Second Configuration Example that Performs Power Supply According to Transmission Distance]

Figure 6:
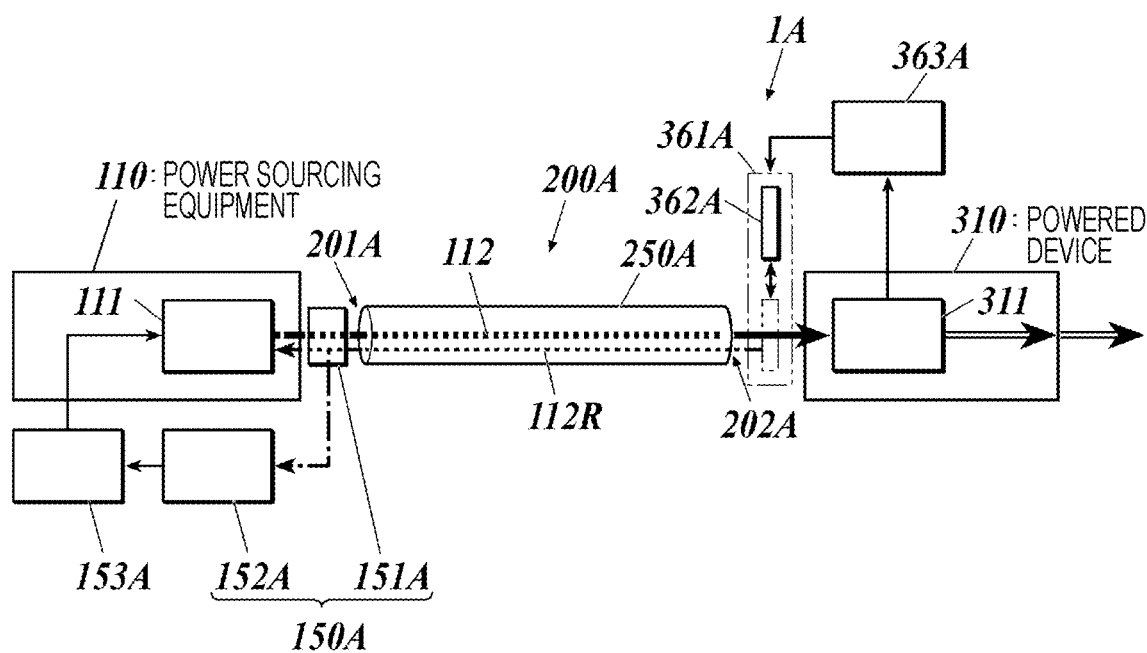
FIG. 6 is a diagram illustrating a second configuration example in which the power-over-fiber system according to the first embodiment of the present disclosure includes a configuration that performs power supply according to a transmission distance.

A second configuration example that performs power supply according to a transmission distance is described next with reference to the drawing. FIG. 6 illustrates a second configuration example in which the power-over-fiber system 1A described above includes a configuration that performs power supply according to a transmission distance.

In this second configuration example, as illustrated in FIG. 6, the power-over-fiber system 1A of the first configuration example additionally includes a reflecting device 361A, and a control device 363A for the reflecting device 361A. The reflecting device 361A includes a mirror 362A that reflects the feed light 112 between the optical fiber cable 200A and the powered device 310.

In the case of this second configuration example, the distance is measured using the reflected light 112R from the mirror 362A instead of the reflected light 112R of the feed light 112 reflected at the end face of the optical fiber cable 200A adjacent to the powered device 310. The second configuration example is the same as the first configuration example except for this point.

The reflecting device 361A includes an actuator that switches the position of the mirror 362A between a reflection position where the mirror 362A can reflect the feed light 112 between the optical fiber cable 200A and the powered device 310 and a standby position where the mirror 362A does not hinder the feed light 112 from being incident onto the photoelectric conversion element 311.

The control device 363A is constituted by a microcomputer, a sequencer using an analog circuit or a digital circuit, or the like, and controls the above-described operation of switching the position of the mirror 362A performed by the reflecting device 361A.

As the initial position, the reflecting device 361A holds the mirror 362A at the standby position. In response to the feed light 112 entering the photoelectric conversion element 311 from the power sourcing equipment 110 when power supply is started or when the system starts up, a power source is supplied to the control device 363A.

In response to being supplied with the power source, the control device 363A performs control to temporarily switch the position of the mirror 362A of the reflecting device 361A to the reflection position and then return the mirror 362A to the standby position.

This allows the control device 153A to determine the distance from the power sourcing equipment 110 to the powered device 310 by measuring a time elapsed from the start of output of the feed light 112 to receipt of the reflected light 112R from the mirror 362A. The aforementioned elapsed time includes a delay time from when the photoelectric conversion element 311 receives the feed light 112 to when the control device 363A switches the position of the mirror from the standby position to the reflection position. Thus, this delay time is obtained in advance through measurement or the like, and is stored in the control device 153A. The control device 153A substrates the delay time from the elapsed time, and then calculates the distance.

Instead of providing the control device 363A, a connection may be made such that the control device 153A can control the reflecting device 361A through a line (such as a signal line, for example) different from that for the feed light 112.

In such a case, the reflecting device 361A preferably holds the mirror 362A at the reflection position as the initial position, and the control device 153A preferably performs control to switch the position of the mirror 362A to the standby position after the reflected light 112R is detected.

This can omit the necessity of taking into account the delay time from when the photoelectric conversion element 311 receives the feed light 112 to when the control device 363A switches the position of the mirror from the standby position to the reflection position.

In this second configuration example, the same effects as those of the first configuration example are obtained. In addition, when the measurer 150A uses reflection of the feed light 112, which is laser light, at the mirror 362A to measure the distance from the power sourcing equipment 110 to the powered device 310, the measurer 150A can use the reflected light 112R having a higher light intensity. Thus, the measurer 150A can measure the distance more stably with a higher accuracy.

The reflecting device 361A described above employs the movable mirror 362A. Instead of this configuration, a reflecting device including an optical element capable switching between a light reflecting state and a light passing state in accordance with a control signal may be used.

In the first and second configuration examples, the examples of using the power-over-fiber system 1A as the base configuration have been presented. However, the power over fiber system 1 may be configured, as in the first configuration example, to include the measurer 150A and the control device 153A and perform control for supplementing the feed light 112. Further, the power over fiber system 1 may be configured, as in the second configuration example, to additionally include the reflecting device 361A and the control device 363A for the reflecting device 361A and cause the feed light 112 to be reflected at the mirror 362A.

[Third Configuration Example that Performs Power Supply According to Transmission Distance]

A third configuration example that performs power supply according to a transmission distance is described next with reference to the drawing.

Figure 7:
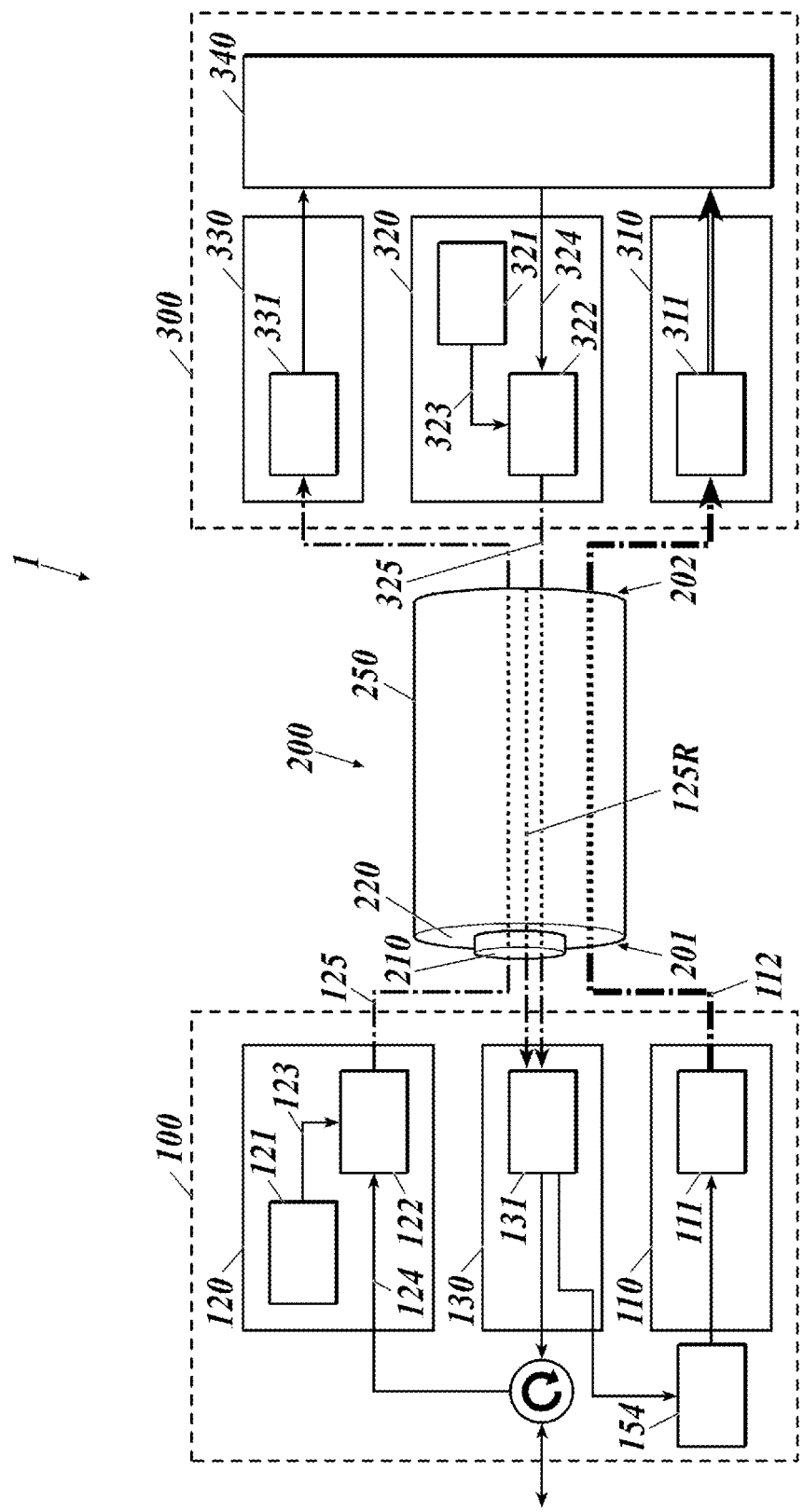
FIG. 7 is a diagram illustrating a third configuration example in which the power-over-fiber system according to the second embodiment of the present disclosure includes a configuration that performs power supply according to a transmission distance.

FIG. 7 illustrates a third configuration example in which the power-over-fiber system 1 described above includes a configuration that performs power supply according to a transmission distance.

To perform power supply according to a transmission distance, the power-over-fiber system 1 of this third configuration example uses reflected light 125R of the signal light 125, which is laser light, reflected at an end face of the optical fiber cable 200 adjacent to the second data communication device 300 (the powered device 310), instead of the reflected light 112R of the feed light 112.

In the power-over-fiber system 1, the first data communication device 100 including the power sourcing equipment 110 includes the photodiode 131 for signals that receives the signal light 325 from the semiconductor laser 321 for signals. Thus, the power-over-fiber system 1 uses the photodiode 131 for signals as a measurer to receive the reflected light 125R of the signal light 125 and to measure the distance.

The power-over-fiber system 1 additionally includes a control device 154 that controls the transmitter 120 and the power sourcing equipment 110.

At the time of measurement of a distance from the first data communication device 100 (the power sourcing equipment 110) to the second data communication device 300 (the powered device 310), this control device 154 outputs the single-pulse signal light 125 from the semiconductor laser 121 for signals of the transmitter 120 and measures a time elapsed before the photodiode 131 for signals detects the reflected light 125R of the signal light 125. The control device 154 calculates the distance from the power sourcing equipment 110 to the powered device 310 on the basis of the measured elapsed time.

The control device 154 that has the function of calculating the distance, the semiconductor laser 121 for signals, and the photodiode 131 for signals constitute the measurer.

This control device 154 also includes a memory that stores a table data indicating a relationship between an attenuation rate of the feed light 112 and a transmission distance. With reference to the table data, the control device 154 identifies an attenuation rate corresponding to the distance from the first data communication device 100 (the power sourcing equipment 110) to the second data communication device 300 (the powered device 310) obtained through the measurement.

Similarly to the control device 153A described above, after obtaining the attenuation rate of the feed light 112, the control device 154 controls the semiconductor laser 111 for power supply to output the feed light such that the feed light has an intensity equal to the sum of the original output and an amount of attenuation. This supplemented feed light 112 is continuously output after the distance is measured.

Also in the case of this third configuration example, the control device 154 may control the semiconductor laser 111 for power supply such that the feed light 112 has an intensity obtained by adding an amount by which the intensity is deficient from the intensity of the feed light 112 required by the second data communication device 300 (the powered device 310) because of attenuation.

This control device 154 may also be constituted by a microcomputer, or by a sequencer using an analog circuit or a digital circuit.

The distance is measured when power supply is started (including a timing immediately before the start) or when the power-over-fiber system 1 starts up (including a timing immediately before the startup).

In the power-over-fiber system 1 of this third configuration example, the feed light 112 is output after an amount of attenuation of the feed light 112 is compensated for based on the measured distance from the first data communication device 100 (the power sourcing equipment 110) to the second data communication device 300 (the powered device 310). Thus, the power-over-fiber system 1 can improve the photoelectric conversion efficiency and can also perform appropriate power supply by compensating for attenuation of the feed light 112.

Further, since the power-over-fiber system 1 uses the photodiode 131 for signals that receives the reflected light 125R of the signal light 125 to measure the distance, there is no need to provide the separator 151A in the channel of the feed light 112. Thus, the transmission efficiency of the feed light 112 can be kept high.

In addition, since the photodiode 131 for signals, which is a fundamental component of the power-over-fiber system 1, is utilized, the number of components to be newly added can be reduced. This can reduce the number of components and reduce the production cost accordingly.

[Fourth Configuration Example that Performs Power Supply According to Transmission Distance]

A fourth configuration example that performs power supply according to a transmission distance is described next with reference to the drawing.

FIG. 8 illustrates a fourth configuration example in which the power-over-fiber system 1 described above includes a configuration that performs power supply according to a transmission distance.

The power-over-fiber system 1 of this fourth configuration example uses a measurer, emission of the signal light (laser light) 125 from the semiconductor laser 121 for signals, which is a laser light source, in the first data communication device 100 (adjacent to the power sourcing equipment 110), and a response, to the emission, of the signal light (laser light) 325 from the semiconductor laser 321 for signals, which is a laser light source, in the second data communication device 300 (adjacent to the powered device 310) to measure the distance from the first data communication device 100 (the power sourcing equipment 110) to the second data communication device 300 (the powered device 310).

The power-over-fiber system 1 additionally includes a control device 155 that controls the transmitter 120 and the power sourcing equipment 110.

At the time of measurement of the distance from the first data communication device 100 (the power sourcing equipment 110) to the second data communication device 300 (the powered device 310), this control device 155 controls the modulator 122 of the transmitter 120 to cause the semiconductor laser 121 for signals to output the signal light 125 for distance measurement.

In the second data communication device 300, in response to the photodiode 331 for signals receiving the signal light 125 for distance measurement, the data processor 340 controls the modulator 322 to cause the semiconductor laser 321 for signals to output the signal light 325 serving as a response.

To enable the signal light 125 from the semiconductor laser 121 for signals to be identified as the signal light 125 for distance measurement, the modulator 122 desirably performs unique modulation in the first data communication device 100.

Likewise, to enable the signal light 325 from the semiconductor laser 321 for signals to be identified as the signal light 325 serving as a response, the modulator 322 desirably performs unique modulation in the second data communication device 300.

The control device 155 measures a time elapsed before the photodiode 131 for signals detects the signal light 325. The control device 155 then calculates the distance from the power sourcing equipment 110 to the powered device 310 on the basis of the measured elapsed time. The aforementioned elapsed time includes a delay time from when the signal light 125 is received to when the signal light 325 is output in the second data communication device 300. Thus, this delay time is obtained in advance through measurement or the like, and is stored in the control device 155.

This allows the control device 155 to subtract the delay time from the elapsed time and to calculate the distance from the first data communication device 100 (the power sourcing equipment 110) to the second data communication device 300 (the powered device 310) on the basis of a transmission speed of light.

The control device 155 that has the function of calculating the distance, the semiconductor laser 121 for signals, the modulator 122, the photodiode 131 for signals, the semiconductor laser 321 for signals, the modulator 322, the photodiode 331 for signals, and the data processor 340 constitute the measurer.

Similarly to the control device 154 described above, this control device 155 also includes a memory that stores a table data indicating a relationship between an attenuation rate of the feed light 112 and a transmission distance. After obtaining the attenuation rate of the feed light 112, the control device 155 controls the semiconductor laser 111 for power supply to output the feed light such that the feed light has an intensity equal to the sum of the original output and an amount of attenuation. This supplemented feed light 112 is continuously output after the distance is measured.

Also in this case, the control device 155 may control the semiconductor laser 111 for power supply such that the feed light 112 has an intensity obtained by adding an amount by which the intensity is deficient from the intensity of the feed light 112 required by the second data communication device 300 (the powered device 310) because of attenuation.

This control device 155 may also be constituted by a microcomputer, or by a sequencer using an analog circuit or a digital circuit.

The distance is measured when power supply is started (including a timing immediately before the start) or when the power-over-fiber system 1 starts up (including a timing immediately before the startup). However, the distance is preferably measured in a state in which at least the power source for the second data communication device 300 is secured by the feed light 112.

In this fourth configuration example, the same effects as those of the third configuration example are obtained. In addition, since emission of the signal light 125 from the semiconductor laser 121 for signals in the first data communication device 100 and a response, to the emission, of the signal light 325 from the semiconductor laser 321 for signals in the second data communication device 300 are used to measure the distance from the first data communication device 100 (the power sourcing equipment 110) to the second data communication device 300 (the powered device 310), the signal light 125 and the signal light 325 that have higher light intensities can be used. This enables the distance to be measured more stably with a higher accuracy.

[Others]

While the embodiments of the present disclosure have been described above, these embodiments are merely presented as examples and can be carried out in various other forms. Each component may be omitted, replaced, or modified within a range not departing from the gist of the invention.

For example, FIGS. 5 to 8 present examples in which the configuration that performs power supply according to a transmission distance is applied to the power-over-fiber systems 1 and 1A. In the same manner as these examples, the configuration that performs power supply according to a transmission distance is also applicable to the power-over-fiber system 1B.

INDUSTRIAL APPLICABILITY

The power-over-fiber systems according to the present invention have an industrial applicability in a power-over-fiber system that performs power supply by changing the laser wavelength.

The invention claimed is:

1. A power-over-fiber system, comprising:
a power sourcing equipment including a semiconductor laser configured to oscillate with electric power to output feed light;
a powered device including a photoelectric conversion element configured to convert the feed light into electric power;
an optical fiber cable configured to transmit the feed light from the power sourcing equipment to the powered device;
a measurer configured to measure a distance from the power sourcing equipment to the powered device; and
a control device configured to control the power sourcing equipment to output the feed light after compensating for an amount of attenuation of the feed light according to a transmission distance on the basis of the distance from the power sourcing equipment to the powered device measured by the measurer,
wherein the measurer is configured to measure the distance from the power sourcing equipment to the powered device before the control device starts up.

2. The power-over-fiber system according to claim 1, wherein the measurer is configured to measure the distance from the power sourcing equipment to the powered device when the power sourcing equipment starts power supply.

3. The power-over-fiber system according to claim 1, wherein the measurer is configured to use reflection of laser light at an end face of the optical fiber cable to measure the distance from the power sourcing equipment to the powered device.

4. The power-over-fiber system according to claim 1, wherein the measurer is configured to use reflection of laser light at a mirror to measure the distance from the power sourcing equipment to the powered device.

5. The power-over-fiber system according to claim 1, wherein the measurer is configured to use emission of laser light from a laser light source adjacent to the power sourcing equipment and a response, to the emission, of laser light from a laser light source adjacent to the powered device to measure the distance from the power sourcing equipment to the powered device.

6. The power-over-fiber system according to claim 1, wherein a semiconductor material of a semiconductor region that exhibits a light-electricity conversion effect of the semiconductor laser is a laser medium having a laser wavelength of 500 nm or shorter.

7. The power-over-fiber system according to claim 1, wherein a semiconductor material of a semiconductor region that exhibits a light-electricity conversion effect of the photoelectric conversion element is a laser medium having a laser wavelength of 500 nm or shorter.

8. A power-over-fiber system, comprising:
a power sourcing equipment including a semiconductor laser configured to oscillate with electric power to output feed light;
a powered device including a photoelectric conversion element configured to convert the feed light into electric power;
an optical fiber cable configured to transmit the feed light from the power sourcing equipment to the powered device;
a measurer configured to measure a distance from the power sourcing equipment to the powered device; and
a control device configured to control the power sourcing equipment to output the feed light after compensating for an amount of attenuation of the feed light according to a transmission distance on the basis of the distance from the power sourcing equipment to the powered device measured by the measurer,
wherein the measurer is configured to use emission of laser light from a laser light source adjacent to the power sourcing equipment and a response, to the emission, of laser light from a laser light source adjacent to the powered device to measure the distance from the power sourcing equipment to the powered device.

9. The power-over-fiber system according to claim 8, wherein the measurer is configured to measure the distance from the power sourcing equipment to the powered device when the power sourcing equipment starts power supply.

10. The power-over-fiber system according to claim 8, wherein the measurer is configured to measure the distance from the power sourcing equipment to the powered device before the control device starts up.

11. The power-over-fiber system according to claim 8, wherein a semiconductor material of a semiconductor region that exhibits a light-electricity conversion effect of the semiconductor laser is a laser medium having a laser wavelength of 500 nm or shorter.

12. The power-over-fiber system according to claim 8, wherein a semiconductor material of a semiconductor region that exhibits a light-electricity conversion effect of the photoelectric conversion element is a laser medium having a laser wavelength of 500 nm or shorter.

* * * * *